United States Patent
Hormuth et al.

(10) Patent No.: US 11,704,159 B2
(45) Date of Patent: Jul. 18, 2023

(54) SYSTEM AND METHOD FOR UNIFIED INFRASTRUCTURE ARCHITECTURE

(71) Applicant: Dell Products L.P., Hopkinton, MA (US)

(72) Inventors: Robert Wayne Hormuth, Cedar Park, TX (US); Elie Antoun Jreij, Pflugerville, TX (US); Jimmy Doyle Pike, Georgetown, TX (US); William Price Dawkins, Lakeway, TX (US); Gaurav Chawla, Austin, TX (US); Mark Steven Sanders, Roanoke, VA (US); Mukund P. Khatri, Austin, TX (US); Walter A. O'Brien, III, Westborough, MA (US); Yossef Saad, Ganei Tikva (IL)

(73) Assignee: DELL PRODUCTS L.P., Hopkinton, MA (US)

( * ) Notice: Subject to any disclaimer, the term of this patent is extended or adjusted under 35 U.S.C. 154(b) by 6 days.

(21) Appl. No.: 17/117,034

(22) Filed: Dec. 9, 2020

(65) Prior Publication Data
US 2022/0179712 A1 Jun. 9, 2022

(51) Int. Cl.
*G06F 9/50* (2006.01)
(52) U.S. Cl.
CPC .......... *G06F 9/5044* (2013.01); *G06F 9/5077* (2013.01)
(58) Field of Classification Search
CPC .............................. G06F 9/5044; G06F 9/5077
See application file for complete search history.

(56) References Cited

U.S. PATENT DOCUMENTS

| | | |
|---|---|---|
| 7,478,117 B1 | 1/2009 | Lamb et al. |
| 7,606,892 B2 | 10/2009 | Piet et al. |
| 7,620,984 B2 | 11/2009 | Kallahalla |
| 8,095,929 B1 | 1/2012 | Ji et al. |
| 8,276,140 B1 | 9/2012 | Beda, III et al. |
| 8,285,747 B1 | 10/2012 | English |
| 8,306,948 B2 | 11/2012 | Chou |
| 8,499,066 B1 | 7/2013 | Zhang et al. |
| 8,589,659 B1 | 11/2013 | Shapiro |
| 8,606,920 B1 | 12/2013 | Gupta et al. |
| 8,997,242 B2 | 3/2015 | Chen |

(Continued)

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

(Continued)

*Primary Examiner* — Sisley N Kim
(74) *Attorney, Agent, or Firm* — Chamberlain, Hrdlicka, White, Williams & Aughtry

(57) ABSTRACT

An information handling system for instantiating a composed information handling includes hardware computing resources. The hardware computing resources includes a compute resource set that includes computing resources including a processor and a memory, and a hardware resource set including resources distinct from the compute resource set. The information also includes a hardware system control processor adapted to present a portion of the hardware resource set to a compute resource set of the composed information handling system as bare metal resources.

18 Claims, 8 Drawing Sheets

(56) References Cited

U.S. PATENT DOCUMENTS

| | | |
|---|---|---|
| 9,104,844 B2 | 8/2015 | Fang |
| 9,105,178 B2 | 8/2015 | Carlson |
| 9,245,096 B2 | 1/2016 | Abuelsaad |
| 9,413,819 B1 | 8/2016 | Berg et al. |
| 9,529,689 B2 | 12/2016 | Ferris et al. |
| 9,569,598 B2 | 2/2017 | Abuelsaad |
| 9,600,553 B1 | 3/2017 | Nigade et al. |
| 9,613,147 B2 | 4/2017 | Carlson |
| 9,678,977 B1 | 6/2017 | Aronovich |
| 9,959,140 B2 | 5/2018 | Jackson |
| 10,097,438 B2 | 10/2018 | Ferris et al. |
| 10,348,574 B2 | 7/2019 | Kulkarni |
| 10,382,279 B2 | 8/2019 | Roese |
| 10,601,903 B2 | 3/2020 | Bivens |
| 10,628,225 B2 | 4/2020 | Yamato |
| 10,756,990 B1 | 8/2020 | Chakkassery Vidyadharan et al. |
| 10,782,882 B1 | 9/2020 | Wu |
| 10,795,856 B1 | 10/2020 | Smith et al. |
| 10,909,283 B1 | 2/2021 | Wang et al. |
| 10,994,198 B1 | 5/2021 | Byskal et al. |
| 11,119,739 B1 | 9/2021 | Allen et al. |
| 11,134,013 B1 | 9/2021 | Allen et al. |
| 11,221,886 B2 | 1/2022 | Bivens et al. |
| 2003/0028642 A1 | 2/2003 | Agarwal et al. |
| 2003/0061262 A1 | 3/2003 | Hahn et al. |
| 2003/0233427 A1 | 12/2003 | Taguchi |
| 2004/0257998 A1 | 12/2004 | Chu et al. |
| 2006/0082222 A1 | 4/2006 | Pincu et al. |
| 2006/0230407 A1 | 10/2006 | Rosu et al. |
| 2006/0236100 A1 | 10/2006 | Baskaran et al. |
| 2008/0052480 A1 | 2/2008 | Satoyama et al. |
| 2008/0313476 A1 | 12/2008 | Hansen |
| 2009/0199193 A1 | 8/2009 | Jackson |
| 2010/0217865 A1 | 8/2010 | Ferris |
| 2011/0055378 A1 | 3/2011 | Ferris et al. |
| 2011/0099147 A1 | 4/2011 | Mcalister et al. |
| 2011/0154500 A1 | 6/2011 | Sahita et al. |
| 2011/0307570 A1 | 12/2011 | Speks |
| 2012/0047328 A1 | 2/2012 | Williams et al. |
| 2013/0007710 A1 | 1/2013 | Vedula et al. |
| 2013/0311434 A1 | 11/2013 | Jones |
| 2013/0332901 A1 | 12/2013 | Berg et al. |
| 2013/0346718 A1 | 12/2013 | Meshchaninov et al. |
| 2014/0007097 A1 | 1/2014 | Chin et al. |
| 2014/0149635 A1 | 5/2014 | Bacher et al. |
| 2014/0165063 A1 | 6/2014 | Shiva et al. |
| 2014/0223233 A1 | 8/2014 | Heyrman et al. |
| 2014/0279884 A1 | 9/2014 | Dantkale et al. |
| 2014/0282820 A1 | 9/2014 | Walton et al. |
| 2014/0359356 A1 | 12/2014 | Aoki |
| 2015/0106165 A1 | 4/2015 | Rai et al. |
| 2015/0220455 A1 | 8/2015 | Chen et al. |
| 2015/0317173 A1 | 11/2015 | Anglin |
| 2015/0381426 A1 | 12/2015 | Roese et al. |
| 2016/0062441 A1 | 3/2016 | Chou et al. |
| 2016/0180087 A1 | 6/2016 | Edwards et al. |
| 2016/0224903 A1 | 8/2016 | Talathi et al. |
| 2016/0259665 A1 | 9/2016 | Gaurav et al. |
| 2017/0034012 A1 | 2/2017 | Douglas et al. |
| 2017/0041184 A1 | 2/2017 | Broz et al. |
| 2017/0048200 A1 | 2/2017 | Chastain |
| 2017/0097851 A1 | 4/2017 | Chen |
| 2017/0118247 A1 | 4/2017 | Hussain |
| 2017/0195201 A1 | 7/2017 | Mueller et al. |
| 2017/0201574 A1 | 7/2017 | Luo |
| 2018/0024964 A1 | 1/2018 | Mao |
| 2018/0063145 A1 | 3/2018 | Cayton et al. |
| 2019/0065061 A1 | 2/2019 | Kim et al. |
| 2019/0065256 A1 | 2/2019 | Hamilton et al. |
| 2019/0164087 A1 | 5/2019 | Ghibril et al. |
| 2019/0188014 A1 | 6/2019 | Easterling et al. |
| 2019/0190778 A1 | 6/2019 | Easterling et al. |
| 2019/0205180 A1 | 7/2019 | Macha et al. |
| 2019/0227616 A1 | 7/2019 | Jenne et al. |
| 2019/0324808 A1 | 10/2019 | Krishnan et al. |
| 2019/0334774 A1 | 10/2019 | Bennett et al. |
| 2019/0356729 A1 | 11/2019 | Bivens et al. |
| 2019/0356731 A1 | 11/2019 | Bivens et al. |
| 2019/0384516 A1 | 12/2019 | Bernat |
| 2019/0384648 A1 | 12/2019 | Wiggers et al. |
| 2019/0386902 A1 | 12/2019 | Mueller et al. |
| 2020/0026564 A1 | 1/2020 | Bahramshahry et al. |
| 2020/0028854 A1 | 1/2020 | Fabrizi et al. |
| 2020/0034221 A1 | 1/2020 | Ganesan et al. |
| 2020/0044966 A1 | 2/2020 | Krishnan et al. |
| 2020/0065254 A1 | 2/2020 | Cao et al. |
| 2020/0097358 A1 | 3/2020 | Mahindru et al. |
| 2020/0174949 A1 | 6/2020 | Ramasamy et al. |
| 2020/0218561 A1* | 7/2020 | Lal ..................... G06F 9/45558 |
| 2020/0233582 A1 | 7/2020 | Chen et al. |
| 2020/0293375 A1 | 9/2020 | Klein |
| 2020/0341786 A1 | 10/2020 | Soryal |
| 2020/0341798 A1 | 10/2020 | Duleba |
| 2020/0356200 A1 | 11/2020 | Blanco et al. |
| 2020/0358714 A1 | 11/2020 | Singleton, IV et al. |
| 2021/0019062 A1 | 1/2021 | Fessel |
| 2021/0019162 A1 | 1/2021 | Viswanathan et al. |
| 2021/0037466 A1 | 2/2021 | Silva et al. |
| 2021/0111942 A1 | 4/2021 | Tahhan et al. |
| 2021/0117389 A1 | 4/2021 | Cui et al. |
| 2021/0117441 A1 | 4/2021 | Patel et al. |
| 2021/0152659 A1 | 5/2021 | Cai et al. |
| 2021/0224093 A1 | 7/2021 | Fu et al. |
| 2021/0367901 A1 | 11/2021 | Singh et al. |
| 2021/0397494 A1 | 12/2021 | Graham |
| 2022/0179701 A1 | 6/2022 | Saad et al. |
| 2022/0197773 A1 | 6/2022 | Butler et al. |
| 2023/0026690 A1 | 1/2023 | Dawkins et al. |
| 2023/0033296 A1 | 2/2023 | Shetty et al. |

OTHER PUBLICATIONS

International Searching Authority, International Search Report and Written Opinion dated Oct. 21, 2021 for corresponding PCT Application No. PCTUS2021029708 filed Apr. 28, 2021.

International Searching Authority, International Search Report and Written Opinion for corresponding PCT Application No. PCTUS2021029702 filed Apr. 28, 2021, Aug. 19, 2021, 13 pages.

International Searching Authority, International Search Report and Written Opinion dated Jul. 19, 2021, Issued in corresponding PCT Application No. PCT/US2021/029687, 11 pages.

International Searching Authority, International Search Report and Written Opinion of corresponding PCT Application No. PCT/US2021/029698, dated Aug. 9, 2021, 15 pages.

Alachiotis, Nikolaos, et al. "dReDBox: A disaggregated architectural perspective for data centers." Hardware Accelerators in Data Centers. Springer, Cham, 2019. pages 35-56. (Year: 2019).

Mohammadi et al, Towards an end-to-end architecture, Towards an end-to-end architecture, 2018, pp. 514-518, 44th Euromicro Conference (5 pages).

Chunlin, Li, Tang Jianhang, and Luo Youlong, Hybrid cloud adaptive scheduling strategy for heterogeneous workloads, Hybrid cloud adaptive scheduling strategy for heterogeneous workloads, Year: 2019, pp. 419-446, Journal of Grid Computing 17 (28 pages).

* cited by examiner

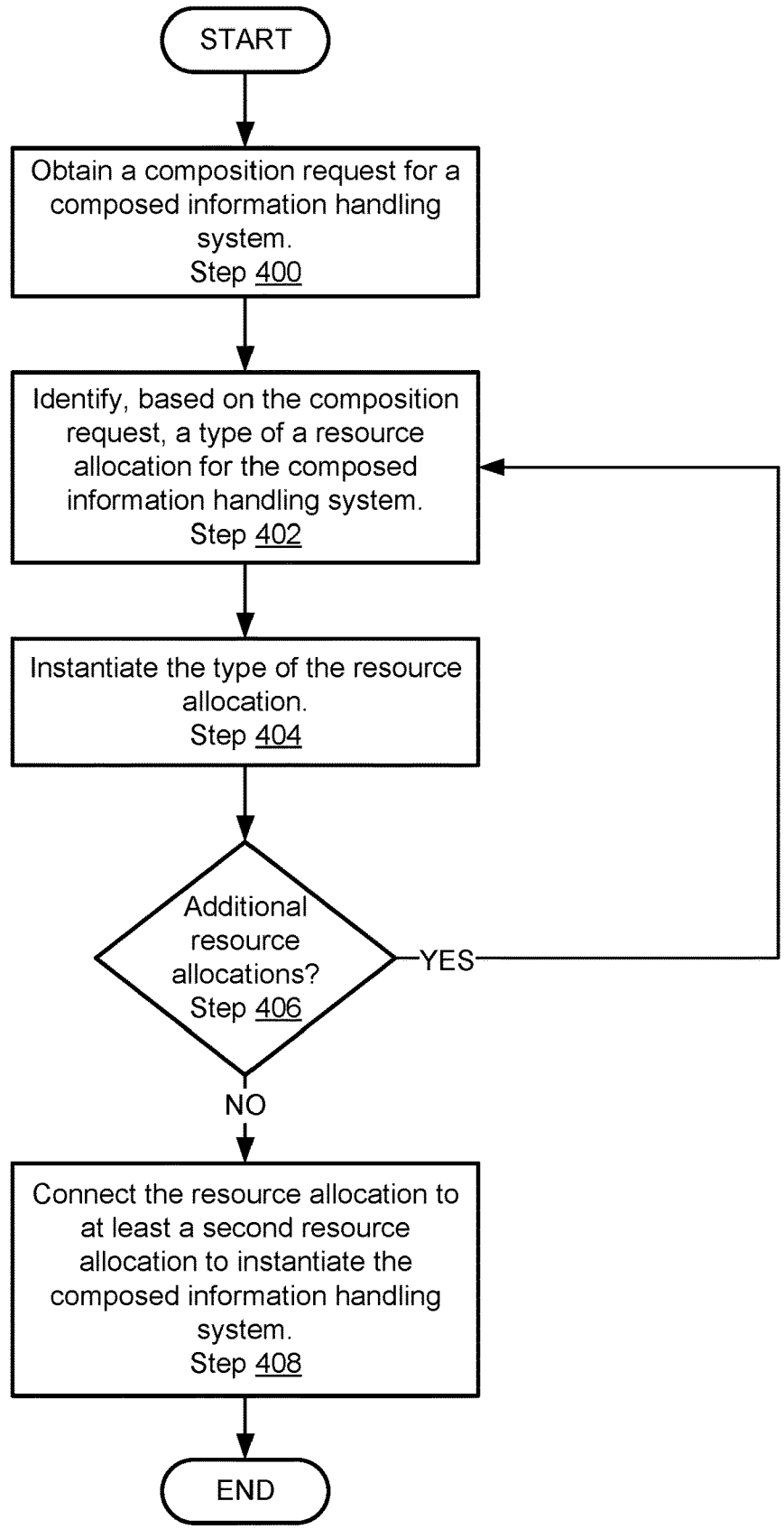
FIG. 4.1

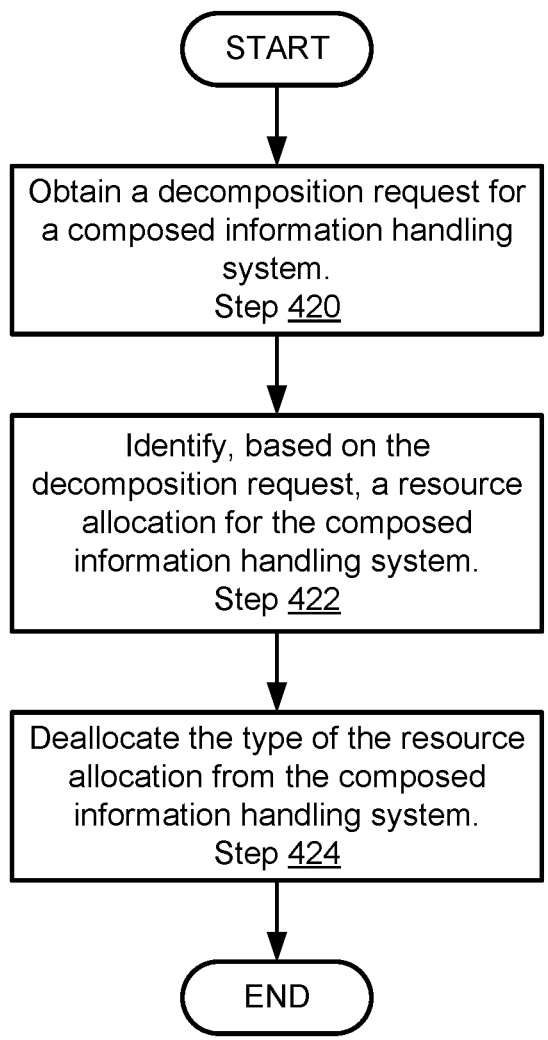
FIG. 4.2

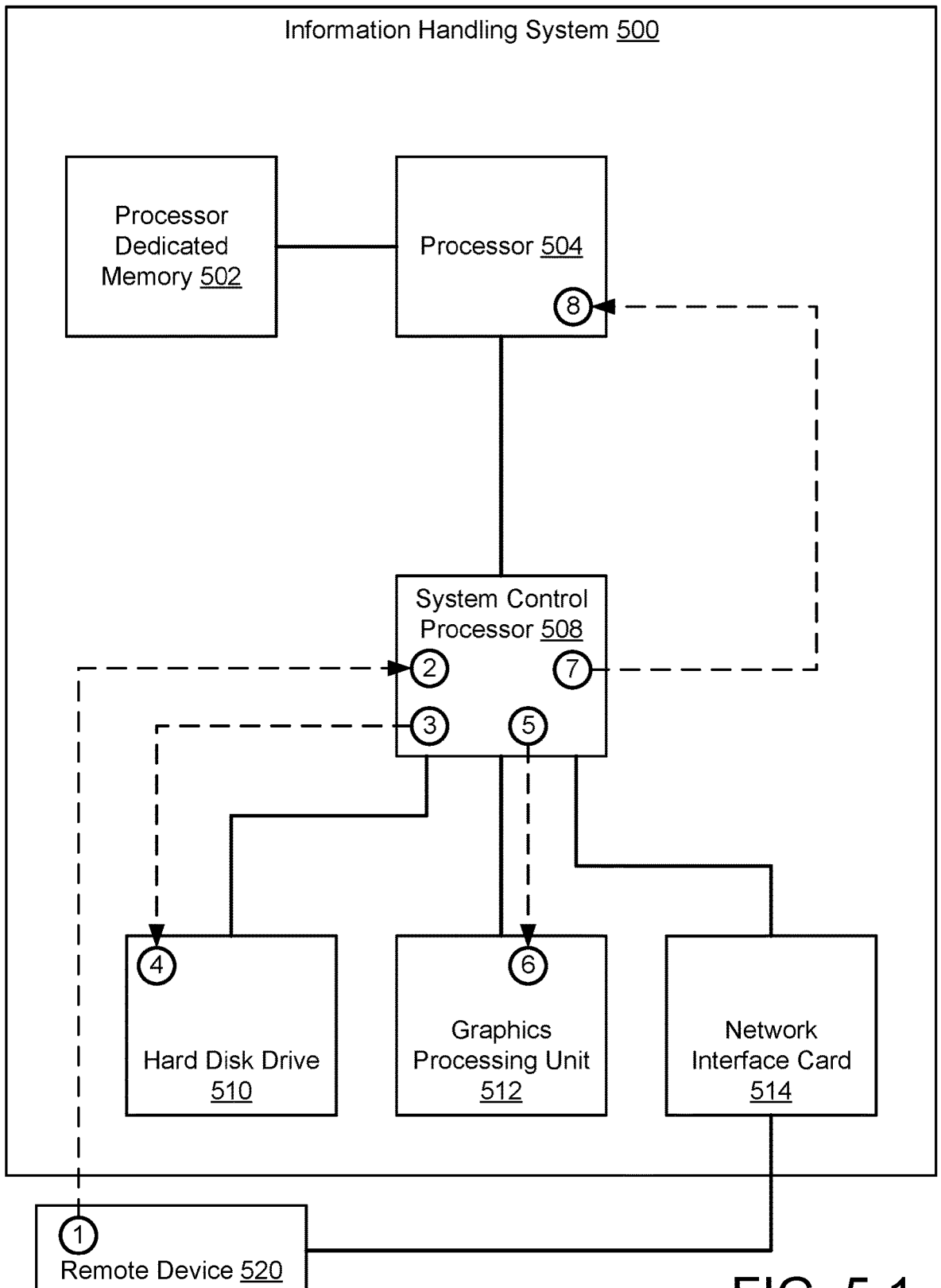
FIG. 5.1

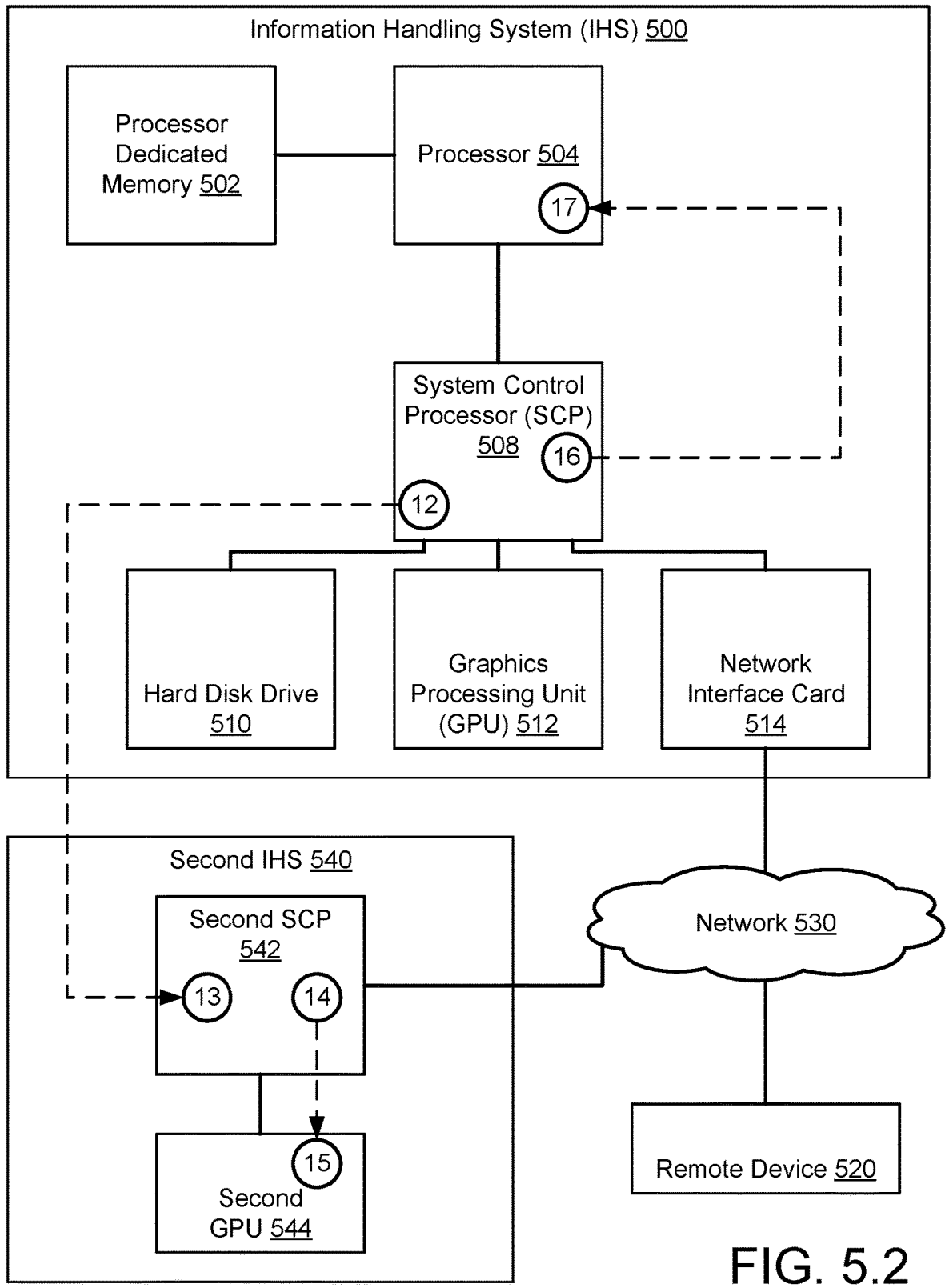
FIG. 5.2

SYSTEM AND METHOD FOR UNIFIED INFRASTRUCTURE ARCHITECTURE

BACKGROUND

Computing devices may provide services. To provide the services, the computing devices may include hardware components and software components. The services provided by the computing devices may be limited by these components.

SUMMARY

In one aspect, an information handling system for instantiating a composed information handling system in accordance with one or more embodiments of the invention includes hardware computing resources. The hardware computing resources includes a compute resource set that includes computing resources including a processor and a memory, and a hardware resource set including resources distinct from the compute resource set. The information also includes a hardware system control processor adapted to present a portion of the hardware resource set to a compute resource set of the composed information handling system as bare metal resources.

In one aspect, a method for dynamically instantiating composed information handling systems based on composition requests specifying resources of the composed information handling systems in accordance with one or more embodiments of the invention includes obtaining, by a hardware system control processor of an information handling system, a composition request of the composition requests for a composed information handling system of the composed information handling systems; identifying, by the hardware system control processor and based on the composition request, a type of a resource allocation from a hardware resource set of the information handling system for the composed information handling system; instantiating, by the hardware system control processor, the type of the resource allocation; and connecting, by the hardware system control processor, the resource allocation to at least a second resource allocation to instantiate the composed information handling system.

In one aspect, a non-transitory computer readable medium in accordance with one or more embodiments of the invention includes computer readable program code, which when executed by a computer processor enables the computer processor to perform a method for dynamically instantiating composed information handling systems based on composition requests specifying resources of the composed information handling systems. The method includes obtaining, by a hardware system control processor of an information handling system, a composition request of the composition requests for a composed information handling system of the composed information handling systems; identifying, by the hardware system control processor and based on the composition request, a type of a resource allocation from a hardware resource set of the information handling system for the composed information handling system; instantiating, by the hardware system control processor, the type of the resource allocation; and connecting, by the hardware system control processor, the resource allocation to at least a second resource allocation to instantiate the composed information handling system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4.1 shows a flowchart of a method of operating an information handling system to obtain a composed system in accordance with one or more embodiments of the invention.

FIG. 4.2 shows a flowchart of a method of operating a composed information handling system to deallocate resources from a composed system in accordance with one or more embodiments of the invention.

FIGS. 5.1-5.2 show diagrams of the operation of an example system over time in accordance with one or more embodiments of the invention.

DETAILED DESCRIPTION

Figure 1:
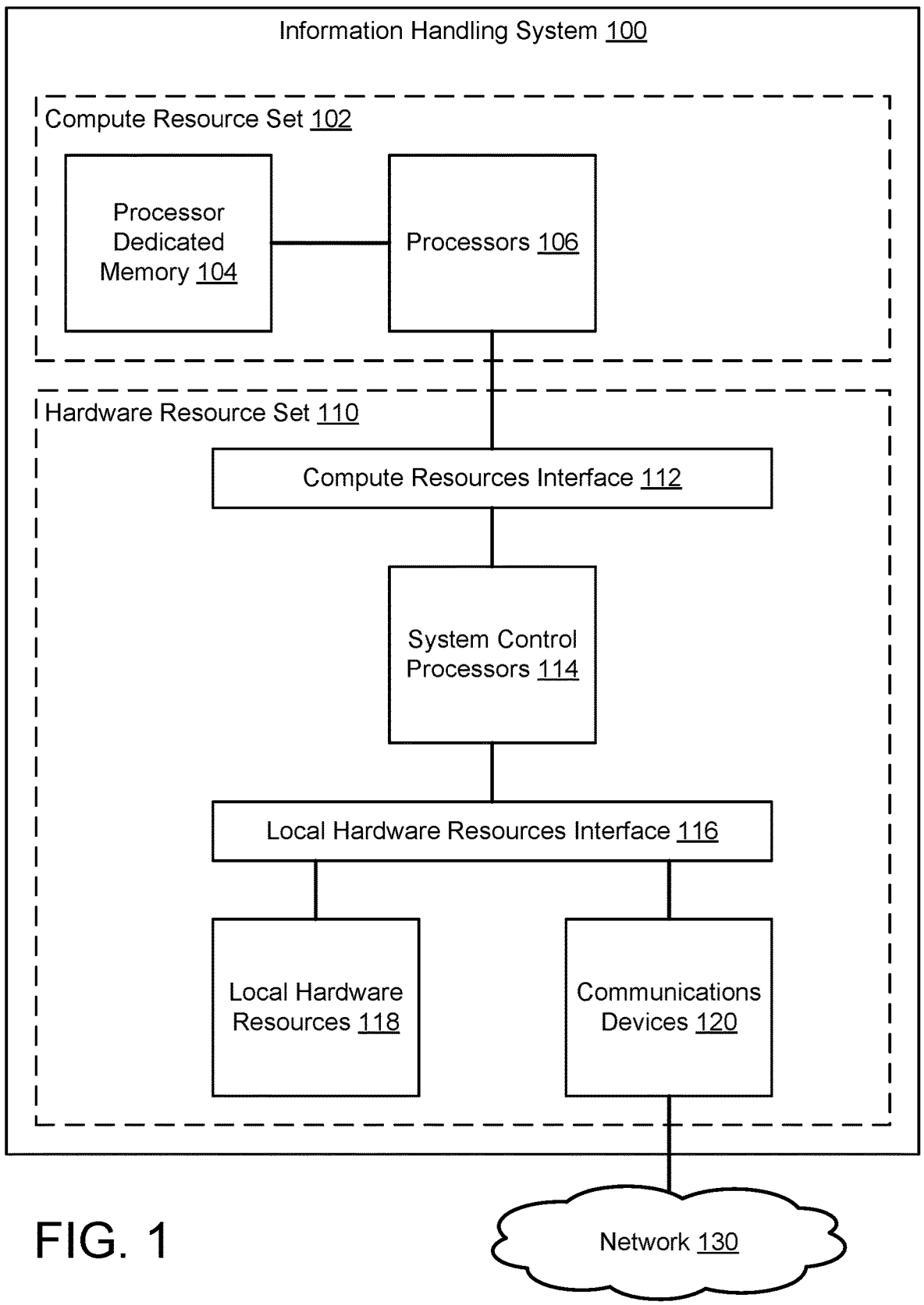
FIG. 1 shows a diagram of an information handling system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing the operation of information handling systems. An information handling system may include computing resources usable to provide computer implemented services. The manner in which the computer implemented services are provided may depend on the quantity of resources allocated for performance of the computer implemented services.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, one or more information handling systems may include a system control processor. A system control processor may be a device that manages, allocates, and presents computing resources of one or more information handling systems to a processor of an information handling system as bare metal resources to form a composed information handling system.

The computing resources, while presented as bare metal resources, may be managed as virtualized resources and/or as emulated resources by one or more system control processors. The management of these computing resources by the system control processor may be transparent to the processor(s) of the information handling system(s) (e.g., the system control processor acting as the manager of the data plane) thereby not requiring the processors, and applications hosted thereby, to manage the computing resources. Consequently, diverse types of computing resources that may otherwise require control plane entities (e.g., hypervisors, virtualization layers, abstraction layers, etc.) to be executed by the processor may be utilized by the processor in a manner that is entirely transparent to the processor.

Additionally, the system control processor may manage the computing resources in a manner that is consistent with a data integrity model, security model, workload management model, or other management model while still presenting the resulting computing resources as bare metal resources to the processor. Consequently, using a system control processor, composed information handling systems may automatically operate in accordance with these models (e.g., store data redundantly, encrypt stored data, analyze workload performance, etc.) without incurring the performance penalty for executing control plane entities (e.g., hypervisors, controllers, etc.) or meeting organizational requirements to comply with these models.

By doing so, embodiments of the invention may provide a framework for unified security, manageability, resource management/composability, workload management, and distributed system management by use of system control processors. To provide the aforementioned unified framework, the system control processors may obtain composition requests for instantiating composed information handling system from a management entity and manage, allocate, and operate the computing resources of the information handling systems in accordance with the composition requests.

Managing computing resources of information handling systems in this manner may enable the computing resources to be differentiated to provide different functionalities including, for example, server, storage, networking, data protection, mass storage, etc.

FIG. 1 shows a system in accordance with one or more embodiments of the invention. The system may include one or more information handling systems (e.g., 100). The information handling system (100) illustrated in FIG. 1 may be representative of the other information handling systems (not shown) of the system.

The information handling system (100) may provide computer implemented services. The computer implemented services may include, for example, database services, data storage services, electronic communications services, data protection services, and/or other types of services that may be implemented using information handling systems.

The information handling system of the system of FIG. 1 may operate independently or cooperatively to provide the computer implemented services. For example, a single information handling system (e.g., 100) may provide a computer implemented service on its own (i.e., independently) while multiple other information handling systems may provide a second computer implemented service cooperatively (e.g., each of the multiple other information handling systems may provide similar and/or different services that form the cooperatively provided service).

To provide computer implemented services, the information handling system (100) may utilize computing resources provided by hardware devices (e.g., processors (e.g., 106), memory (e.g., 104), communications devices (e.g., 120), and/or other types of hardware devices (e.g., 118)). The computing resources may include, for example, processing resources, storage resources, memory resources, graphics processing resources, communications resources, and/or other types of resources provided by the hardware devices.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services.

In general, embodiments of the invention relate to system, methods, and devices for managing the hardware resources of the information handling system (100) and/or information handling systems to provide computer implemented services. The hardware resources of the information handling system (100) may be managed by instantiating one or more composed information handling systems using the hardware resources of the information handling system (100), other information handling systems operably connected to the information handling system (100), and/or other types of hardware devices operably connected to the information handling system (100). Consequently, the computing resources allocated to a composed information handling system may be tailored to the specific needs of the services that will be provided by the composed information handling system.

In one or more embodiments of the invention, a composed information handling system is a device that is formed using all, or a portion, of the computing resources of the information handling system (100), other information handling systems, and/or other types of hardware devices operably connected to the information handling system (100). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling system (100) may include at least two resource sets including a compute resource set (102) and a hardware resource set (110). The compute resource set (102) may include one or more processors (106) operably connected to processor dedicated memory (104).

The processors (106) of the compute resource set (102) may be operably connected to one or more system control processors (114) of the hardware resource set (110). For example, the processors (106) may be connected to a compute resource interface (112), which is also connected to the system control processors (114).

The system control processors (114) of the hardware resource set (110) may present computing resources to the processors (106) as bare metal resources. In other words, from the point of view of the processors (106), any number of bare metal resources may be operably connected to it via the compute resources interface (112) when, in reality, the system control processor (114) is operably connected to the processors (106) via the compute resources interface (112).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112). Consequently, indirection, remapping, and/or other functions required for resource virtualization, emulation, abstraction, or other methods of resource allocation (other than bare metal) may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processor (114) may present any number of resources operably connected to it (e.g., the local hardware resources (118), other resources operably connected to it via the communications devices (120), etc.) as bare metal resources to the processors (106) of the compute resource set. Consequently, the system control processor (114) may implement device discovery processes compatible with the processors (106) to enable the processors (106) to utilize the presented computing resources.

For example, the hardware resource set (110) may include local hardware resources (118) and communications devices (120) operably connected to the system control processors (114) via a local hardware resources interface (116). The local hardware resources (118) may include any number of hardware devices that provide computing resources. For additional details regarding the local hardware resources (118), refer to FIG. 2.

The communications devices (120) may provide communications services to other devices operably connected to the information handling system (100) via a network (130). For example, the communications devices (120) may operably connect the information handling system (100) to other information handling systems and/or other types of devices. The system control processors of multiple operably connected information handling systems may cooperate to present computing resources from any of the information handling systems as bare metal resources to any of the processors of the information handling systems to form composed information handling systems.

For example, consider a scenario where two information handling systems are operably connected to each other and both information handling systems include a single graphics processing device as part of the local hardware resources (e.g., 118) of the respective information handling systems. If a desired computer implemented service is to be provided that requires the use of both graphics processing units, a composed information handling system may be formed that presents both graphics processing units as bare metal resources connected to a compute resource set (102) of one of the information handling systems even though neither graphics processing unit is directly connected to the processors of the compute resource set and one of the graphics processing units is remote to the compute resource set of the composed information handling system.

Figure 3:
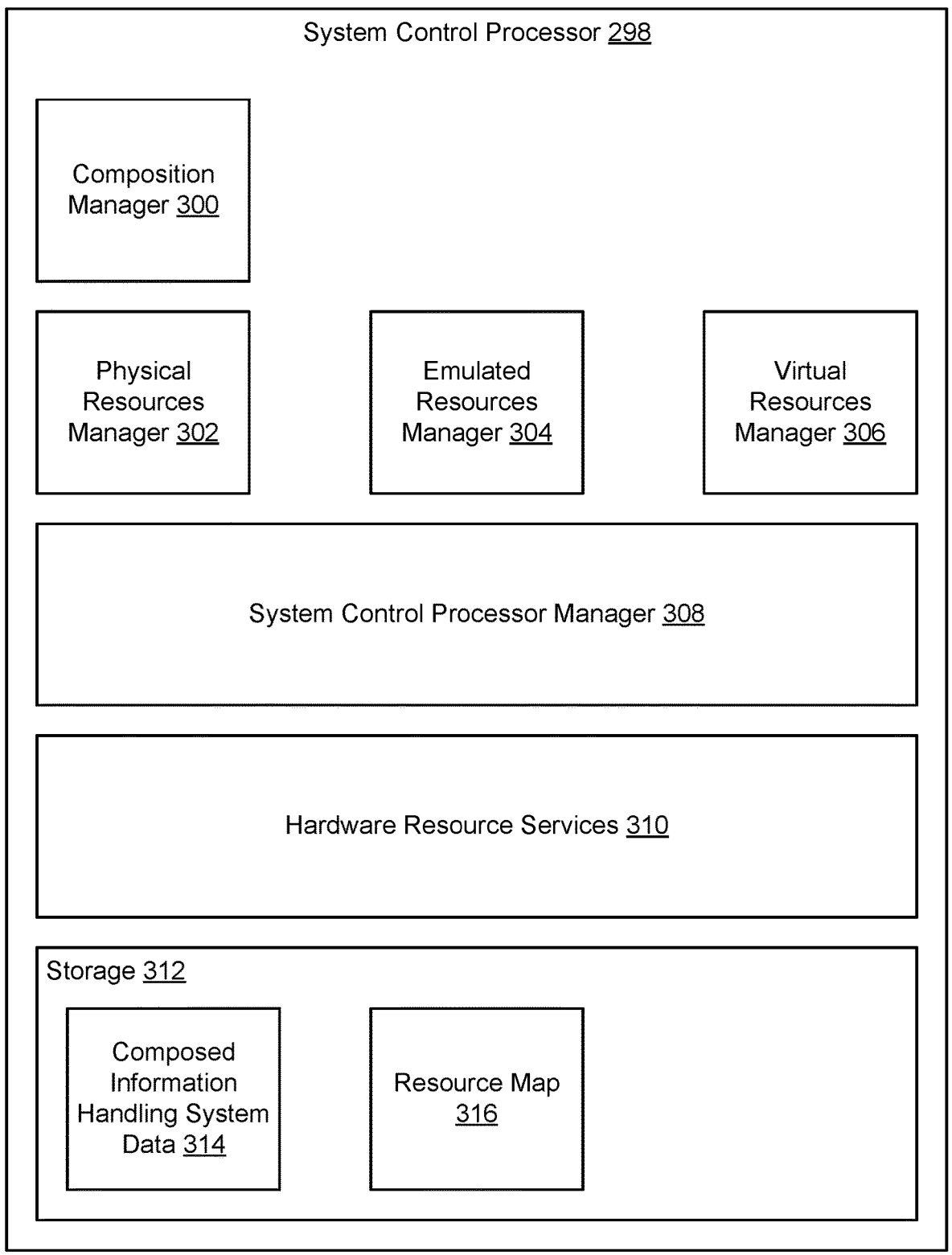
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The local hardware resources interface (116) may be implemented using any suitable interconnection technology including, for example, system buses such as compute express links, peripheral serial interface (PCI) express fabric, and/or other communications standards. The local hardware resources interface (116) may support any input/output (IO) protocol, any memory protocol, any coherence interface, etc. The local hardware resources interface (116) may support processor to device connections, processor to memory connections, and/or other types of connections. The local hardware resources interface (116) may be implemented using one or more hardware devices including circuitry adapted to provide the functionality of the local hardware resources interface (116).

The communications devices (120) may be implemented using any suitable devices for providing communications services. The communications devices (120) may include one or more network interface devices such as network interface controllers (NICs). The NICs may include one or more hardware devices including circuitry adapted to provide the functionality of the communications devices (120).

In one or more embodiments of the invention, the communications devices (120) support multiple, independent connections. For example, the communications devices (120) may support a first network communications connection (e.g., an in-band connection) that may be allocated for use by applications hosted by the processors (106). The communications devices (120) may also support a second network communications connection (e.g., an out-of-band connection) that may be allocated for use by applications hosted by the system control processors (114). These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connection to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 4.1-4.2. The information handling system (100) may be implemented using other types of computing devices without departing from the invention. For additional details regarding computing devices, refer to FIG. 6.

While the information handling system (100) has been illustrated and described as including a limited number of specific components, an information handling system in accordance with embodiments of the invention may include additional, fewer, and/or different components without departing from the invention.

Figure 2:
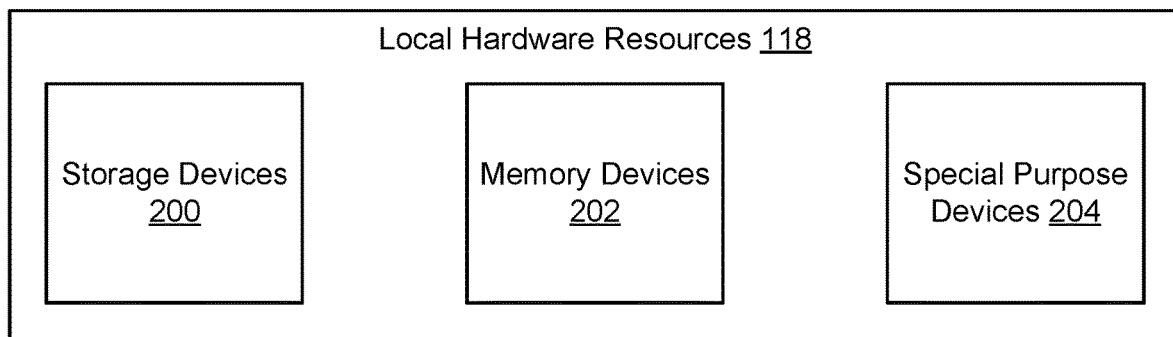
FIG. 2 shows a diagram of local hardware resources in accordance with one or more embodiments of the invention.

Turning to FIG. 2, FIG. 2 shows a logical diagram of the local hardware resources (118) in accordance with one or more embodiments of the invention. As noted above, system control processors of information handling system may present resources including, for example, some of the local hardware resources (118) to form a composed information handling system.

The local hardware resources (118) may include any number and type of hardware devices that may provide any quantity and type of computing resource. For example, the local hardware resources (118) may include storage devices (200), memory devices (202) and special purpose devices (204).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balances, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balances, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, etc. The special purpose devices (204) may include other types of devices for providing other types of computing resources without departing from the invention.

The system control processors of the information handling systems may mediate presentation of the computing resources provided by the local hardware resources (118) to computing resource sets (e.g., as bare metal resources to processors). When doing so, the system control processors may provide a layer of abstraction that enables the local hardware resources (118) to be, for example, virtualized, emulated as being compatible with other systems, and/or directly connected to the compute resource sets (e.g., pass through). Consequently, the computing resources of the local hardware resources (118) may be finely, or at a macro level, allocated to different composed information handling systems.

While the local hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors (114, FIG. 1) of FIG. 1 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services.

To instantiate and operate composed information handling systems, the system control processor (298) may include a composition manager (300), a physical resources manager (302), an emulated resources manager (304), a virtual resources manager (306), a system control processor manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) monitor the operation of the composed information handling systems, (vii) add/remove/modify resources presented to the compute resource sets of composed information handling systems dynamically in accordance with workloads being performed by the composed information handling systems, and/or (viii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics. In such a scenario, the composition manager may decide how to instantiate the composed information handling system (e.g., which resources to allocate in which manners and to which compute resource set(s) to obtain an instantiated composed information handling system).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resources set to be compatible with the compute resources set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtain from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resources set. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resources sets to hardware devices), bare metal resource addressing of virtualized resources, and/or as emulated resources compatible with the hardware components of the compute resources set.

The functionality of the physical resources manager (302), emulated resources manager (304), and virtual resources manager (306) may be invoked using any communication model including, for example, message passing, state sharing, memory sharing, etc.

The system control processor manager (308) may manage the general operation of the system control processor (298). For example, the system control processor manager (308) may operate as an operating system or other entity that manages the resources of the system control processor (298). The composition manager (300), physical resources manager (302), emulated resources manager (304), virtual resources manager (306), and/or other entities hosted by the system control processor (298) may call or otherwise utilize the system control processor manager (308) to obtain appropriate resources (e.g., processing resources, memory resources, storage, communications, etc.) to provide their functionalities.

The hardware resource services (310) may facilitate use of the hardware components of a hardware resource set (e.g., 110, FIG. 1). For example, the hardware resource services (310) may include driver functionality to appropriately communicate with the hardware devices of the hardware resource set. The hardware resource services (310) may be invoked by, for example, the system control processor manager (308).

When providing their functionalities, any of the aforementioned components of the system control processor (298) may perform all, or a portion, of the methods illustrated in FIGS. 4.1-4.2.

The system control processor (298) may be implemented using computing devices. The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 4.1-4.2. The system control processor (298) may be implemented using other types of computing devices without departing from the invention. For additional details regarding computing devices, refer to FIG. 6.

In one or more embodiments of the invention, the system control processor (298) is implemented as an on-board device. For example, the system control processor (298) may be implemented using a chip including circuitry disposed on a circuit card. The circuit card may also host the compute resource set and/or some of the components of a hardware resource set managed by the system control processor (298).

In one or more embodiments of the invention, the composition manager (300), physical resources manager (302), emulated resources manager (304), virtual resources manager (306), system control processor manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), system control processor manager (308), and/or hardware resource services (310). The composition manager (300), physical resources manager (302), emulated resources manager (304), virtual resources manager (306), system control processor manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), system control processor manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), system control processor manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314) and a resource map (316). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

As discussed above, the system of FIG. 1 may provide computer implemented services using composed information handling systems. FIGS. 4.1-4.2 show methods that may be performed by components of the system of FIG. 1 to manage composed information handling systems.

FIG. 4.1 shows a flowchart of a method in accordance with one or more embodiments of the invention. The method depicted in FIG. 4.1 may be performed to provide computer implemented services using a composed information handling system in accordance with one or more embodiments of the invention. The method shown in FIG. 4.1 may be performed by, for example, a composition manager (e.g., 300, FIG. 3). Other components of the system in FIG. 1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a composition request for a composed information handling system is obtained. The composition request may be obtained using any method without departing from the invention. For example, the composition request may be obtained as part of a message from another entity operably connected to an information handling system. In another example, the composition request may be locally stored in a storage of an information handling system.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how a system control processor is to utilize resources for presentation of resources to composed information handling systems. The methods employed by the system control processors may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processor of the information handling system and system control processors of the other information handling systems. These connections may be used by the system control processor to present, as bare metal resources, computing resources from other information handling systems to compute resource set(s) of the composed information handling system.

In step 402, a type of resource allocation for the information handling system is identified based on the composition request. As noted above, a composition request may specify computing resources to be allocated to a composed information handling system specifically or via intent.

If specified specifically, the type of resource allocation for the information handling system may be identified based on the information included in the composition request. In other words, the composition request may specify the type of resource allocation (e.g., devices to use to present the computing resources, whether a layer of abstraction for device emulation is to be employed, etc.).

If specified via intent, the type of resource allocation for the information handling system may be identified by the system control processor based on its available resources, the current allocation of those resources, the current operating states of the hardware devices, and the needs indicated by the intent.

For example, the need (i.e., execution of a particular software stack) specified by an intent may first be translated into a gross quantity of computing resources based on, for example, historical information (i.e., comparisons of computing resource requirements for previous instantiations of the software stack). Once the gross quantity of computing resources is identified, the gross resources may then be compared to the existing resources to identify efficient allocations of the existing resources to meet the gross quantity of computing resources.

If only a subset of the computing resources provided by a hardware device is necessary to satisfy the gross computing resource requirements, the system may determine that the type of allocation is to be a virtualized resource so that only the amount required (as opposed to the amount that would be provided should an entire hardware device be allocated) is provided.

Similarly, if the only available hardware devices are incompatible with hardware components of a computing resource set of the composed information handling system, the type may also be emulated to ensure that the allocated computing resources are usable by the compute resource set of the composed information handling system.

Accordingly, the type of resource allocation may specify whether the resource will be presented using any combination of pass through operation, virtualization, and emulation as well as the corresponding hardware devices that will be utilized to present the computing resources.

In step 404, the type of the resource allocation is instantiated. The resource allocation may be instantiated by presenting computing resources using one or more hardware resources as bare metal resources to a compute resource set (e.g., of the information handling system or another information handling system).

For example, if the type of the resource allocation is a pass through device, the allocation may be made by allocating a hardware device managed by the system controller to the compute resource set of the composed information handling system and operating via pass through (e.g., passing through bare metal communications to the hardware device).

In another example, if the type of the resource allocation is a portion of a virtualized resource, the allocation may be made by making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, a corresponding emulation layer between a hardware device corresponding to the type of the resource allocation may be instantiated and linked to the hardware device. Consequently, bare metal communications between the compute resource set and the hardware device used to present the bare metal resource to the compute resource set may be automatically translated by the system control processor.

Instantiating the type of the resource allocation may also include modifying the operation of one or more devices to provide, for example, data integrity functionality (e.g., RAID, ECC, etc.), security functionality (e.g., encryption), and/or other functionalities that are transparent but implemented via management by the system control processor that is transparent to the composed information handling system.

In step 406, it is determined whether there are additional resource allocations that have not yet been satisfied via steps 402-404. For example, as discussed above, a composition request may require a multitude of different types of resource allocations (e.g., processing resources, memory, storage, communications, etc.) to be made to satisfy the request. If all of these resource allocations have not yet been satisfied, the method may return to step 402. If all of the resource allocations have been satisfied, the method may proceed to step 406.

In step 408, the resource allocation is connected to at least one second resource allocation to instantiate the composed information handling system. As noted above, in some cases, a composed information handling system may utilize resources from multiple information handling systems. In these cases, multiple system control processors may cooperate to present remote resources as bare metal resources to compute resource sets of the composed information handling system.

To do so, a connection between the system control processors of the information handling systems that are cooperatively contributing computing resources to the composed information handling system may be instantiated. For example, a virtual private network between these system control processors may be established. The respective system control processor proximate to each respective device providing computing resources to the composed information handling system may manage the pass through, virtualization, emulation, and/or other functionalities required to present the computing resources as bare metal resources. The system control processors may transmit, via the virtual private network, communications including the bare metal communications between the compute resource set of the composed information handling system.

Identifiers of the system control processors that will be utilized to contribute computing resources to the composed information handling system may be utilized to instantiate connection. For example, the identifiers may be used to look up the connectivity/reachability information for the other system control processors. The system control processors may then establish the connection using, for example, a networking protocol compliant communications method of establishing a connection between the system control processors.

While described with respect to a virtual private network, other methods of communication between system control processors may be utilized without departing from the invention.

The method may end following step 408.

Using the method illustrated in FIG. 4.1, a composed information handling system may be formed using computing resources from one or more information handling systems.

Following step 408, no applications may be presently executing on the composed information handling system. The composed information handling systems may then be turned over to other entities for management (e.g., orchestrators) or may be additionally managed by the system control processors by loading applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling system may begin to provide desired computer implemented services. Applications may be instantiated on a composed information handling system using other methods (e.g., performing first-time installations, copying binaries to storage and beginning execution of the binaries, etc.) without departing from the invention.

Concurrently with or following the step illustrated in FIG. 4.1, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems.

Turning to FIG. 4.2, this figure shows a flowchart of a method in accordance with one or more embodiments of the invention. The method depicted in FIG. 4.2 may be performed to provide computer implemented services by decomposing a composed information handling system in accordance with one or more embodiments of the invention. The method shown in FIG. 4.2 may be performed by, for example, a composition manager (e.g., 300, FIG. 3). Other components of the system in FIG. 1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 420, a decomposition request for a composed information handling system is received. The decomposition request may indicate that one or more computing resources of the composed information handling system is to be deallocated from the composed information handling system.

The decomposition request may be obtained from another entity such as, for example, a management entity that manages the computer implemented services provided by the composed information handling system. The decomposition request may be provided in response to, for example, a determination that the composed information handling system is over provisioned with computing resources, that the computer implemented services are no longer desirable, or for other reasons.

In step 422, a resource allocation for the information handling system is identified based on the decomposition request. For example, the decomposition request may specify the computing resource to be deallocated from the information handling system. The resource allocation may correspond to a type of allocation specified by the decomposition request.

In step 424, the type of the resource allocation is deallocated from the composed information handling system. In one or more embodiments of the invention, the type of the resource allocation is deallocated by sending, by the system control processor and via a bare metal communication, a message indicating that the computing resource is being removed. For example, the communication may indicate that the computing resource is shutting down or may otherwise no longer be available in the future.

In response, control plane entities (e.g., the operating system) of the composed information handling system may take proactive action to no longer utilize the computing resources that are being deallocated.

After sending the message, the resource allocation may be deallocated and readied (or otherwise made available) for allocation to another composed information handling system. For example, the resource map (316, FIG. 3) may be updated to indicate that the computing resources and hardware/virtual devices used to provide the computing resources are available for allocation.

The method may end following step 424.

Using the method illustrated in FIG. 5.1, a system in accordance with embodiments of the invention may manage composed information handling systems by modifying the resources allocated to them. By doing so, allocations of computing resources that are not performing useful functionalities (e.g., due to over provisioning) may be reallocated to provide useful functionalities (e.g., reallocated to composed information handling systems lacking sufficient resources to provide desired services). Consequently, embodiments of the invention may provide a system that improves the utilization of computing resources.

To further clarify embodiments of the invention, a non-limiting example is provided in FIGS. 5.1-5.2. FIGS. 5.1-5.2 show a system similar to that illustrated in FIG. 1. Actions performed by components of the illustrated system are illustrated by numbered, circular boxes interconnected, in part, using dashed lines. For the sake of brevity, only a limited number of components of the system of FIG. 1 is illustrated in each of FIGS. 5.1-5.2.

Example

Consider a scenario as illustrated in FIG. 5.1 in which a remote device (520), at step 1, sends a composition request to a system control processor (508) of an information handling system (500) via a network interface card (514) of the information handling system (500). The composition request specifies that a composed information handling system is to be instantiated including 100 gigabytes of storage and graphics processing resources.

In response to the composition request, the system control processor (508), at step 2, determines that it manages sufficient resources to instantiate the composed information handling system. However, a hard disk drive (510) of the information handling system (500) includes 1,000 gigabytes of storage resources, which would be used inefficiently by the composed information handling system if entirely allocated to the composed information handling system. Accordingly, the system control processor (508) virtualizes, at step 3, the hard disk drive by instantiating a hypervisor (or other type of virtualization layer) for the hard disk drive (510) executing on the system control processor (508). Using the hypervisor, the system control processor (508), at step 4, instantiates a virtual disk having 100 gigabytes of storage space and begins presenting the virtual disk to a processor (504) of the information handling system (500) as a bare metal resource.

After presenting the storage resources to the processor (504), the system control processor (508), at step 5, determines that allocating the entire graphics processing resources of the graphics processing unit (512) would be an efficient allocation because the composition request indicates that the composed information handling system will perform a graphics heavy workload. Consequently, at step 6, the system control processor (508) allocates the entire graphics processing unit (512) to the processor (504) by beginning pass through operation to the processor (504). At this point in time, the processor (504) views, as bare metal resources, processor dedicated memory (502), 100 gigabytes of the storage resources of the hard disk drive (510), and the graphics processing unit (512).

To begin operation of the composed information handling system, the system control processor (508), at step 7, obtains software instructions corresponding to the functionality that will be provided by the composed information handling system. At step 8, the system control processor (508) loads the software instructions into the processor (504) and initiates processing of the software instructions.

Based on the execution of the software instructions, the processor (504) begins to send data to the system control processor (508) for storage in the hard disk drive (510) and offloads graphics processing tasks to the graphics processing unit (512).

When the system control processor (508) obtains the bare metal data storage requests from the processor (504), the system control processor (508) uses its software virtualization layer to lookup the physical storage locations in the hard disk drive (510) corresponding to the 100 gigabytes of allocated storage space. The system control processor (508) stores the data provided by the processor (504) in the identified physical storage locations.

In contrast, when the system control processor (508) receives bare metal communications directed toward the graphics processing unit (512), the system control processor (508) merely forwards the communications (and routes corresponding output back to the processor (504)) to the graphics processing unit (512).

By doing so, from the point of view of the processor (504), it has bare metal access to all of the hardware devices it is utilizing to store data and process graphics data.

As the composed information handling system operates, the system control processor monitors its operation. Based on the monitoring, the system control processor identifies that the processor (504) is graphics processing capability constrained and provides the aforementioned information to the remote device (520) as telemetry data reflective of the operation of the composed information handling system.

Turning to FIG. 5.2, at a second point in time, the remote device (520) determines that additional graphics processing resources should be allocated to the composed information handling system based on the telemetry information provided by the system control processor. In response to this determination, the remote device (520) sends an additional composition request indicating that a second graphics processing unit (544) managed by a second system control processor (542) of a second information handling system (540) is to be allocated to the composed information handling system.

In response, the system control processor (508), at step 12, communicates with the second system control processor (542) requesting that the second graphics processing unit (544) be allocated to the system control processor. At step 13, the second system control processor (542) determines that the second graphics processing unit (544) is available for allocation.

In response to the determination, the second system control processor (542), at step 14, prepares the second graphics processing unit (544) for pass through operation, like the first graphics processing unit (512). In step 15, the second system control processor (542) allocates the second graphics processing unit (544) to the composed information handling system.

To begin use of the second graphics processing unit (544) by the composed information handling system, the system control processor (508), in step 16, presents the second graphics processing unit (544) as a bare metal resource to the processor (504) which triggers device discovery by the processor (504) (e.g., by control plane entities executing using the processor (504)). Consequently, in step 17, the processor (504) begins to send bare metal communications to the system control processor (508) for tasks to be performed by the second graphics processing unit (544).

The system control processor (508) and second system control processor (542) relay the aforementioned communications to the second graphics processing unit (544). Accordingly, the composed information handling system begins to utilize the additional graphics processing resources provided by the second graphics processing unit (544) thereby freeing the composed information handling system from being graphics processing resource constrained.

End of Example

Thus, as illustrated in FIGS. 5.1-5.2, embodiments of the invention may provide a system that enables improved computer implemented services to be provided using dynamically instantiated composed information handling systems.

Figure 6:
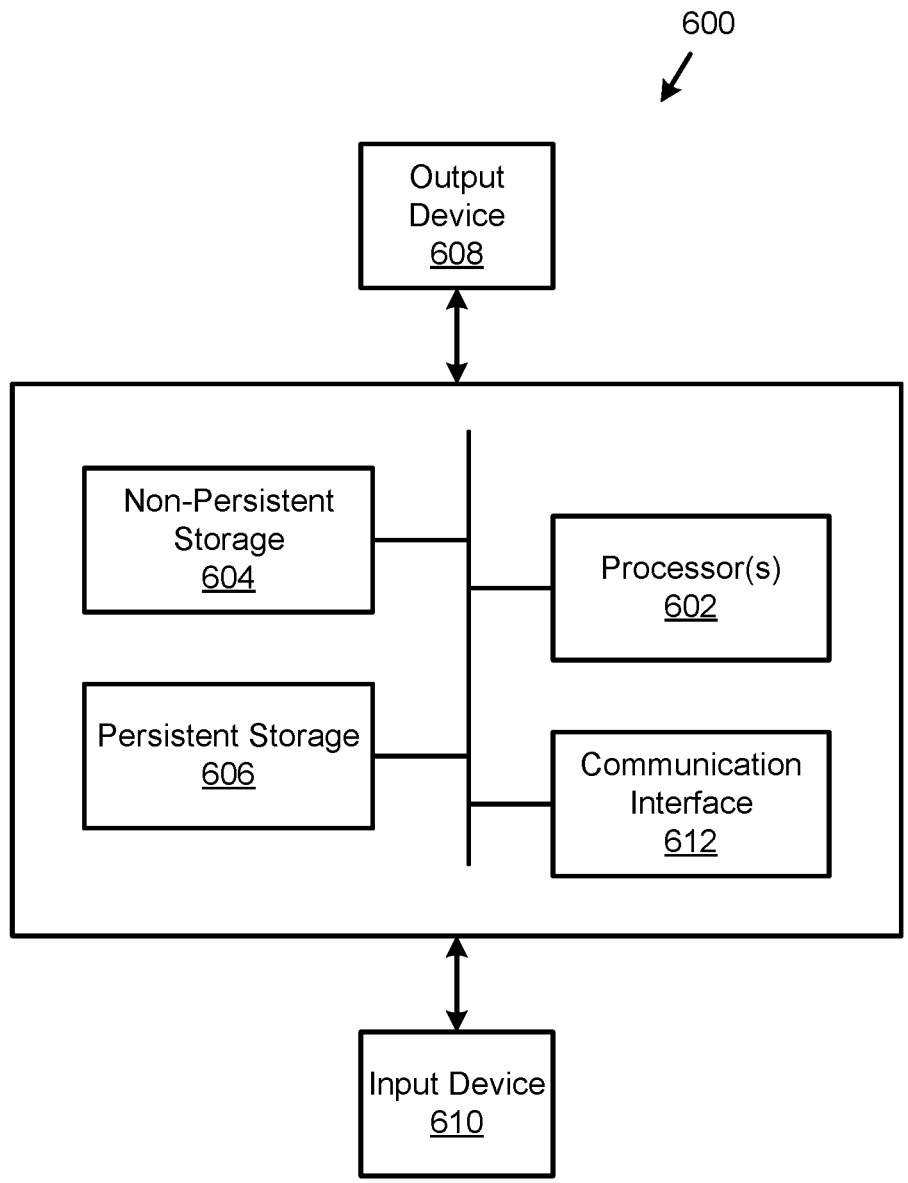
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system and method for dynamically instantiated composed information handling systems. Specifically, embodiments of the invention may provide an information handling system that includes a system control processor that presents resources to processors as bare metal resources, even though the resources may be virtualized, emulated, or operated in a manner that is otherwise transparent to the processor. Consequently, the composed information handling system may operate in a manner consistent with bare metal access to resources (as opposed to a manner where software defined entities executing via the processor define the presentation of the resources). By doing so, composed information handling systems may be instantiated using a multitude of different resources.

Thus, embodiments of the invention may address the problem of resource allocation for composed system. For example, by utilizing a system control processor, resources that may be virtualized or emulated may be presented as bare metal resources to processor of a composed system.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An information handling system for instantiating a composed information handling system, comprising:
    hardware computing resources comprising:
        a compute resource set comprising computing resources comprising a processor and a memory, and
        a hardware resource set comprising resources distinct from the compute resource set; and
    a hardware system control processor adapted to present a portion of the hardware resource set to a compute resource set of the composed information handling system as bare metal resources; wherein the hardware system control processor is programmed to present the portion of the hardware resource set by:
        obtaining a composition request for the composed information handling system;
        identifying, based on the composition request, a type of a resource allocation from the hardware resource set for the composed information handling system;
        instantiating the type of the resource allocation to obtain an instantiated resource allocation; and
        connecting the instantiated resource allocation to at least a second resource allocation to instantiate the composed information handling system;
    wherein instantiating the type of the resource allocation comprises:
        selecting a resource of the hardware resource set corresponding to the type of the resource allocation;
        making a determination that the resource of the hardware resource is incompatible with the second resource allocation;
        in response to the determination:
            emulating, using the resource of the hardware resource, a second resource of the type of the resource allocation to obtain a compatible resource that is compatible with the second resource allocation; and
        using the compatible resource as the portion of the hardware resource set.

2. The information handling system of claim 1, wherein the compute resource set of the composed information handling system is the compute resource set of the hardware computing resources of the information handling system.

3. The information handling system of claim 1, wherein the compute resource set of the composed information handling system is part of a second information handling system that is:
    distinct from the information handling system, and
    operably connected to the information handling system.

4. The information handling system of claim 1, wherein instantiating the type of the resource allocation comprises:
    selecting a resource of the hardware resource set corresponding to the type of the resource allocation;
    preparing the resource for pass through operation to obtain a presentable resource; and
    using the presentable resource as the portion of the hardware resource set.

5. The information handling system of claim 1, wherein instantiating the type of the resource allocation comprises:
    selecting a resource of the hardware resource set corresponding to the type of the resource allocation;
    virtualizing the resource to obtain a virtualized hardware resource; and
    using the virtualized hardware resource as the portion of the hardware resource set.

6. The information handling system of claim 1, wherein connecting the resource allocation to at least a second resource allocation to instantiate the composed information handling system comprises:
    making a determination that the at least the second resource allocation is connected to the hardware system control processor via a compute resource interface that directly connects the hardware system control processor to the processor of the compute resource set;
    in response to the determination:
        using a bare metal resources communication protocol to interconnect the resource allocation with the at least the second resource allocation.

7. The information handling system of claim 1, wherein connecting the resource allocation to at least a second resource allocation to instantiate the composed information handling system comprises:
    making a determination that the at least the second resource allocation is connected to the hardware system control processor via a second hardware system control processor;
    in response to the determination:

identifying a connection between the hardware system control processor and the second hardware system control processor;
establishing, using the connection, communications with the second hardware system control processor; and
using the connection to interconnect the resource allocation with the at least the second resource allocation.

8. The information handling system of claim 7, wherein the connection is a network connection through a network that interconnects the hardware system control processor and the second hardware system control processor.

9. The information handling system of claim 7, wherein the second hardware system control processor relays bare metal resources communication protocol compliant messages between the hardware system control processor and the at least the second resource allocation to interconnect the resource allocation and the at least the second resource allocation.

10. The information handling system of claim 1, where the composition request specifies the type of the resource allocation and an identifier of a second hardware system control processor that manages the at least the second resource allocation.

11. A method for dynamically instantiating composed information handling systems based on composition requests specifying resources of the composed information handling systems, comprising: obtaining, by a hardware system control processor of an information handling system, a composition request of the composition requests for a composed information handling system of the composed information handling systems, wherein the composition request is obtained from storage of the information handling system; identifying, by the hardware system control processor and based on the composition request, a type of a resource allocation from a hardware resource set of the information handling system for the composed information handling system; instantiating, by the hardware system control processor, the type of the resource allocation; and
connecting, by the hardware system control processor, the resource allocation to at least a second resource allocation to instantiate the composed information handling system;
wherein instantiating the type of the resource allocation comprises:
selecting a resource of the hardware resource set corresponding to the type of the resource allocation;
making a determination that the resource of the hardware resource is incompatible with the second resource allocation;
in response to the determination:
emulating, using the resource of the hardware resource, a second resource of the type of the resource allocation to obtain a compatible resource that is compatible with the second resource allocation; and
using the compatible resource as the portion of the hardware resource set.

12. The method of claim 11, where the composition request specifies:
the type of the resource allocation, and
an identifier of a second hardware system control processor that manages the at least the second resource allocation.

13. The method of claim 12, wherein instantiating the type of the resource allocation comprises:
selecting a resource of the hardware resource set corresponding to the type of the resource allocation;
preparing the resource for pass through operation to obtain a presentable resource; and
using the presentable resource as the resource allocation.

14. The method of claim 12, wherein connecting the resource allocation to the at least the second resource allocation to instantiate the composed information handling system comprises:
making, by the hardware system control processor and based on the identifier of the second hardware system control processor, a determination that the at least the second resource allocation is connected to the hardware system control processor via a second hardware system control processor;
in response to the determination:
identifying a connection between the hardware system control processor and the second hardware system control processor;
establishing, using the connection, communications with the second hardware system control processor; and
using the connection to interconnect the resource allocation with the at least the second resource allocation to enable bare metal server communications between the resource allocation and the at least the second resource allocation.

15. A non-transitory computer readable medium comprising computer readable program code, which when executed by a computer processor enables the computer processor to perform a method for dynamically instantiating composed information handling systems based on composition requests specifying resources of the composed information handling systems, the method comprising: obtaining, by a hardware system control processor of an information handling system, a composition request of the composition requests for a composed information handling system of the composed information handling systems, wherein the composition request is obtained from storage of the information handling system; identifying, by the hardware system control processor and based on the composition request, a type of a resource allocation from a hardware resource set of the information handling system for the composed information handling system; instantiating, by the hardware system control processor, the type of the resource allocation; and connecting, by the hardware system control processor, the resource allocation to at least a second resource allocation to instantiate the composed information handling system;
wherein instantiating the type of the resource allocation comprises:
selecting a resource of the hardware resource set corresponding to the type of the resource allocation;
making a determination that the resource of the hardware resource is incompatible with the second resource allocation;
in response to the determination:
emulating, using the resource of the hardware resource, a second resource of the type of the resource allocation to obtain a compatible resource that is compatible with the second resource allocation; and
using the compatible resource as the portion of the hardware resource set.

16. The non-transitory computer readable medium of claim 15, where the composition request specifies:
the type of the resource allocation, and an identifier of a second hardware system control processor that manages the at least the second resource allocation.

17. The non-transitory computer readable medium of claim 16, wherein instantiating the type of the resource allocation comprises:
selecting a resource of the hardware resource set corresponding to the type of the resource allocation;
preparing the resource for pass through operation to obtain a presentable resource; and
using the presentable resource as the resource allocation.

18. The non-transitory computer readable medium of claim 16, wherein connecting the resource allocation to the at least the second resource allocation to instantiate the composed information handling system comprises:
making, by the hardware system control processor and based on the identifier of the second hardware system control processor, a determination that the at least the second resource allocation is connected to the hardware system control processor via a second hardware system control processor;
in response to the determination:
identifying a connection between the hardware system control processor and the second hardware system control processor;
establishing, using the connection, communications with the second hardware system control processor; and
using the connection to interconnect the resource allocation with the at least the second resource allocation to enable bare metal server communications between the resource allocation and the at least the second resource allocation.

* * * * *